US008509746B1

(12) United States Patent
Breau et al.

(10) Patent No.: US 8,509,746 B1
(45) Date of Patent: Aug. 13, 2013

(54) CUSTOMER CARE USING HANDSET DATA FOR DIAGNOSTICS

(75) Inventors: Jeremy R. Breau, Leawood, KS (US); Jason R. Delker, Olathe, KS (US); John M. Everson, Leawood, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 952 days.

(21) Appl. No.: 12/565,875

(22) Filed: Sep. 24, 2009

(51) Int. Cl.
*H04M 3/42* (2006.01)

(52) U.S. Cl.
USPC ........ 455/414.1; 455/418; 455/419; 455/423; 455/425; 370/241; 705/304; 705/346

(58) Field of Classification Search
USPC .......... 455/423–425, 414.1–417, 67.11–67.7, 455/115.1–115.4, 226.1–226.4; 370/241–253; 705/304, 346
See application file for complete search history.

(56) References Cited

U.S. PATENT DOCUMENTS

| | | | |
|---|---|---|---|
| 7,720,494 | B2 | 5/2010 | Ahn |
| 7,966,002 | B2 * | 6/2011 | Harris et al. ............... 455/412.1 |
| 8,005,218 | B2 | 8/2011 | Keeler et al. |
| 8,243,907 | B1 * | 8/2012 | Gailloux et al. ......... 379/207.02 |
| 8,320,891 | B1 * | 11/2012 | Delker et al. .............. 455/414.1 |
| 8,374,334 | B2 * | 2/2013 | Sankaranarayanan ... 379/266.01 |
| 2004/0185827 | A1 | 9/2004 | Parks |
| 2006/0276180 | A1 | 12/2006 | Henry, Jr. |
| 2007/0254636 | A1 | 11/2007 | Jiang |
| 2007/0281669 | A1 * | 12/2007 | Jiang .......................... 455/414.1 |
| 2007/0293199 | A1 * | 12/2007 | Roundtree et al. ......... 455/414.1 |
| 2009/0069040 | A1 | 3/2009 | Wiesmuller et al. |
| 2009/0193141 | A1 * | 7/2009 | Suresh .......................... 709/235 |
| 2009/0275344 | A1 * | 11/2009 | Carlson et al. ............. 455/456.1 |
| 2010/0279666 | A1 * | 11/2010 | Small et al. ................ 455/414.1 |

OTHER PUBLICATIONS

Pre-Interview Communication dated Dec. 21, 2011, U.S. Appl. No. 12/265,410, filed Nov. 5, 2008.
Notice of Allowance dated Mar. 23, 2012, U.S. Appl. No. 12/265,410, filed Nov. 5, 2009.
Supplemental Notice of Allowability dated Jul. 12, 2012, U.S. Appl. No. 12/265,410, filed Nov. 5, 2008.
Pre-Interview Communication dated Dec. 22, 2011, U.S. Appl. No. 12/494,033, filed Jun. 29, 2009.
First Action Interview Office Action dated Feb. 9, 2012, U.S. Appl. No. 12/494,033, filed Jun. 29, 2009.
Notice of Allowance dated Jul. 17, 2012, U.S. Appl. No. 12/494,033, filed Jun. 29, 2009.

* cited by examiner

*Primary Examiner* — Allahyar Kasraian (57) ABSTRACT

System and methods are provided for handset diagnostics. A dialer component intercepts a connection request associated with an entered number, and determines whether the entered number is associated with a specified service. If the entered number is associated with the specified service, a service component presents service options on a user interface of the handset, receives a selection of at least one of the service options, determines handset data based on the selection, and wirelessly communicates the handset data to a server associated with the entered number. The service component may connect the handset to the entered number, wherein the server may promote providing the specified service based on the communicated handset data. Alternatively, the service component may send a message to the user interface to indicate that the server provides the specified service based on the communicated handset data.

17 Claims, 5 Drawing Sheets

CUSTOMER CARE USING HANDSET DATA FOR DIAGNOSTICS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A handset may be a mobile phone, a telephone, a wireless communication device, a pager, a personal digital assistant (PDA), a portable computer, a tablet computer, a laptop computer, a digital camera, a digital music player, a digital calculator, an electronic key fob for keyless entry, a media player, and an inventory control device. A handset user may use a handset to call and request various services from a customer care representative at a customer care center for a communication service provider.

SUMMARY OF THE INVENTION

In some embodiments, a system is provided for handset diagnostics. A dialer component intercepts a connection request associated with an entered number, and determines whether the entered number is associated with a specified service. If the entered number is associated with the specified service, a service component presents service options on a user interface of the handset, receives a selection of at least one of the service options, determines handset data based on the selection, and wirelessly communicates the handset data to a server associated with the entered number. The service component connects the handset to the entered number, wherein the server promotes providing the specified service based on the communicated handset data.

In some embodiments, a method is provided for handset diagnostics. A dialer component intercepts a connection request associated with an entered number, and determines whether the entered number is associated with a specified service. If the entered number is associated with the specified service, a service component presents service options on a user interface of the handset, receives a selection of at least one of the service options, determines handset data based on the selection, and wirelessly communicates the handset data to a server associated with the entered number. The service component connects the handset to the entered number. The server promotes providing the specified service based on the communicated handset data.

In some embodiments, a system is provided for handset diagnostics. A dialer component intercepts a connection request associated with an entered number, and determines whether the entered number is associated with a specified service. If the entered number is associated with the specified service, a service component presents service options on a user interface of the handset, receives a selection of at least one of the service options, determines handset data based on the selection, and wirelessly communicates the handset data to a server associated with the entered number. The service component sends a message to the user interface to indicate that the server provides the specified service based on the communicated handset data.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

If a handset is not able to communicate via text messages or data sessions while simultaneously communicating via voice calls, a customer care center may only provide certain assistance to the user when the user's handset is communicating via a voice call with the customer care center. For example, a user may call a customer care representative and report a handset problem that may be diagnosed by running a diagnostic program on the handset to determine specific handset data. In this situation, the customer care representative may ask the user to hang up on the user's voice call so that the representative may initiate the diagnostic program on the handset, receive the handset data from the handset via a data session or a text message, identify a potential cause of the problem, and contact the user via a voice call to specify what steps need to be taken that may correct the identified problem. The user may become frustrated with waiting to speak to a customer care representative only to be instructed to hang up their handset and wait for some more time before hearing back from the customer care representative.

Systems and methods are provided for handset diagnostics. A dialer component on the handset intercepts a connection request associated with an entered number and determines whether the entered number is associated with a specified service. For example, the dialer component intercepts the call when the user enters "*2" and activates the TALK button, the Enter Command, or other command to originate a call to a customer care center. It is understood hereinafter that calls, such as a call to "*2" as described above, are originated by one of activating the TALK button, the Enter Command, or other command. If the entered number is associated with the specified service, a service component presents service options on a user interface of the handset, receives a selection of at least one of the service options, determines handset data based on the selection, and wirelessly communicates the handset data to a server associated with the entered number. For example, without connecting the requested call to the customer care center, the service component presents options to the user to identify the reason that the user is calling the customer care center, executes a specific diagnostic program to identify handset data based on the user's response, and communicates the identified handset data to a server. The service component may send a message to the user interface to indicate that the server provides the specified service based on the communicated handset data. For example, if the handset data enables the server to correct the problem, the service component informs the user that the problem is corrected. Alternatively, the service component may connect the handset to the entered number, wherein the server may promote providing the specified service based on the communicated handset data. For example, if the server cannot correct the problem itself, the service component connects the handset to the customer care center which has access to the handset data to use when consulting with the user on how to correct the problem. The customer care representative may not need to request for the user to hang up a voice call for the purpose of identifying and communicating handset data.

Some communication service providers use an interactive voice response (IVR) system in addition to or in place of customer care representatives at a customer care center. IVR is a technology that allows a computer to detect voice and keypad inputs. IVR systems can respond with pre-recorded or dynamically generated audio to further direct users on how to proceed. IVR systems can be used to control almost any function where the interface can be broken down into a series of simple menu choices. In some embodiments, when the dialer component intercepts a call to the customer care center, the service component simulates the customer care center's IVR, such that the user may think that the requested voice call has connected to the customer care center. However, because no voice call has been established yet, the handset may run a specific diagnostic program based on user input to identify handset data and communicate the identified handset data to the server for the customer care center, which the server may use to correct the problem. If the user subsequently speaks with a customer care representative, the representative already has the handset data and may not need to ask the user to hang up the voice call for the purpose of identifying and receiving the handset data. The service component may use an IVR to present solutions for handset problems to the handset's user interface. In an embodiment, the user interface of the service component may include both a IVR as well as a screen and/or keyboard input device.

Using text messages and data messages before a call is connected may consume considerably less time, effort, and expenses for a communication service provider than initially connecting voice calls to customer care centers. While handset users may speak to a customer care representative for special cases, the reduction in voice call volume may enable customer care representatives to be available for the special cases and may reduce communication time and expenses for both the handset user and the service provider. Providing such service options may significantly reduce the expenses incurred for handset requests to customer care centers by responding to requests in a quicker and less expensive manner, which may increase customer satisfaction.

Figure 1:
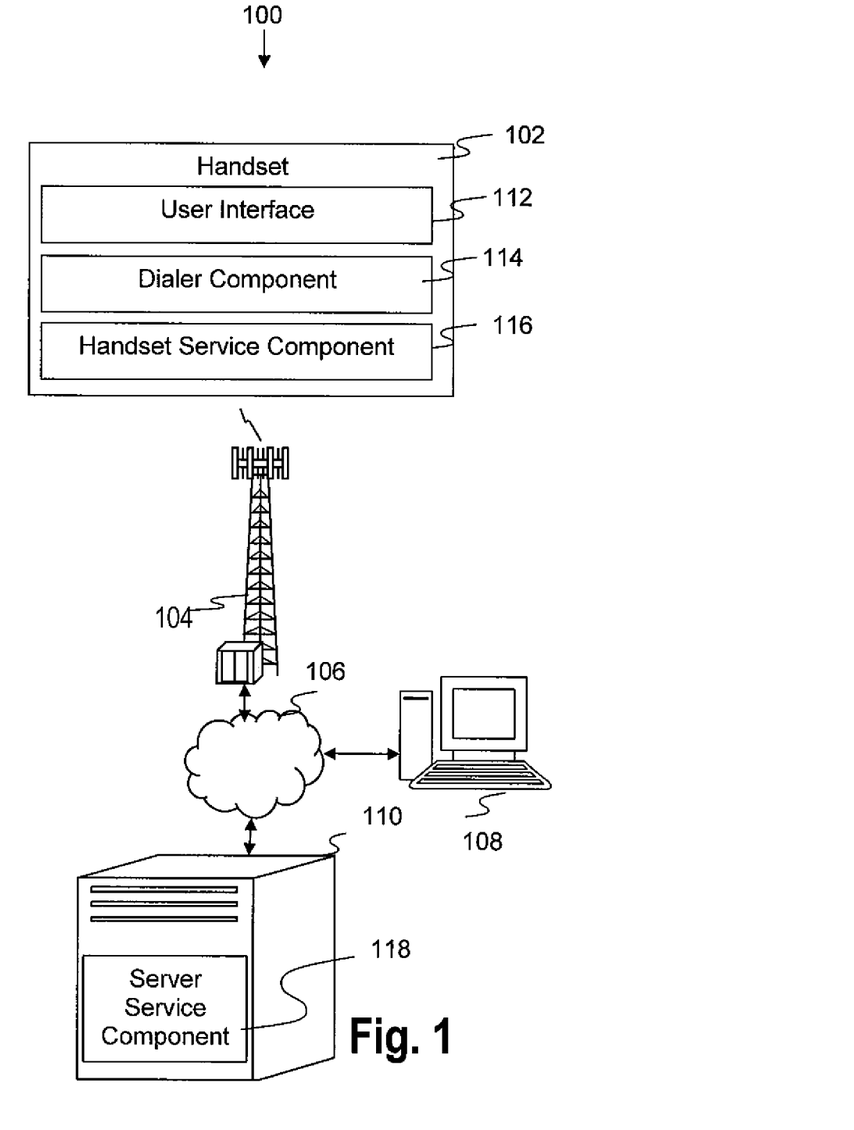
FIG. 1 is a block diagram of a system for handset diagnostics according to some embodiments of the present disclosure.

FIG. 1 is a block diagram of a system 100 for handset diagnostics according to an embodiment of the present disclosure. The system 100 includes a handset 102, a base transceiver station (BTS) 104, a network 106, a customer care center 108, and a server 110. The handset 102, which may be a handset that uses a prepaid billing plan, communicates with the base transceiver station 104, which is coupled to the network 106. The network 106 may enable the handset 102 to access the customer care center 108 for assistance with communication services and to access information on various servers, such as the server 110.

The handset 102 includes a user interface 112, a dialer component 114, and a handset service component 116. The server 110 includes a server service component 118. The user interface 112 presents content to the user of the handset 102.

The dialer component 114 intercepts a connection request associated with an entered number and determines whether the entered number is associated with a specified service. For example, the dialer component 114 intercepts the call when the user enters the shortcut number "*2" to call the customer care center 108. The specified service may be associated with a customer care service and/or a self-provisioning service. For example, the dialer component 114 intercepts the call when the user enters a specific number to call a self-provisioning service that enables the user to download updated applications to the handset 102.

If the entered number is associated with the specified service, the handset service component 116 presents service options on the user interface 112. For example, without connecting the requested call to the customer care center 108, the handset service component 116 presents options to the user to identify the reason that the user is calling the customer care center 108. The handset service component 116 may receive the service options on an occasional basis, such as once a day, once a week, once a month, or at some other interval to enable the service options offered by the handset 102 to remain current with the service options offered by the customer care center 108.

The handset service component 116 receives a selection of at least one of the service options and determines handset data based on the selection. For example, the handset service component 116 executes a diagnostic program to identify handset battery data based on the received user's selection that identifies a handset battery problem. The handset data is information related to the operation of a handset, and may include, but is not limited to, a geo-location of the handset, various radio environment conditions, a battery state, a roaming selection status, camera settings, error logs, records of problems, dropped calls information, handset system parameters, configuration values, CPU/processor usage and activity, other handset systems information, and information other than commonly accessible handset settings, which tend to be more readily accessible to users. Radio environment conditions may include, but not be limited to, channel quality indicators, base station pilot signal strength, noise levels in one or more frequency ranges, radio propagation parameters, and other radio parameters. The user selections determine which specific diagnostic programs the service component 116 executes to identify the handset data.

The handset service component 116 wirelessly communicates the handset data to the server 110 associated with the entered number. For example, the handset service component 116 communicates the handset battery data to the server service component 118 via a data session, a voice session, a short message service (SMS) message, and/or a multimedia messaging service (MMS) message. The handset service component 116 also may communicate the handset data via a short message service (SMS) message via a handset wireless paging channel. In contrast to the user providing the handset 102 to the customer care center 108 where a technician may use a wired connection or a short-range wireless connection to communicate between a diagnostics test computer and the handset 102, the handset service component 116 wirelessly communicates the handset data to the server 110 via a long-range wireless over-the-air communication technology. A Bluetooth connection and a near field communication (NFC) connection are examples of short-range wireless connections, and a universal serial bus (USB) connection is an example of a wired connection. Examples of long-range wireless over-the-air communication technologies include an integrated digital enhanced network (IDEN) communication technology, a code division multiple access (CDMA) technology, a global system for mobile communication (GSM) technology, a universal mobile telecommunications system (UMTS) technology, a long-term evolution (LTE) technology, and a worldwide interoperability for microwave access (WiMAX) technology.

Based on the communicated handset data, the server service component 118 may communicate with the handset service component 116 to correct the identified problem. In this situation, the handset service component 116 sends a message to the user interface 112 to indicate that the server 110 provides the specified service based on the communicated handset data. For example, if the handset data enables the server service component 118 to correct a problem, the handset service component 116 informs the user that the problem is corrected.

Alternatively, the handset service component 116 may connect the handset 102 to the entered number, wherein the server 110 may promote providing the specified service based on the communicated handset data. For example, if the server service component 118 cannot correct the problem via instructions sent to the handset service component 116, then the handset service component 116 connects the handset 102 to the customer care center 108 which has access to the handset data to use when consulting with the user about how to correct the problem. In an embodiment, the customer care center 108 may also connect to the server 110 and access the communicated handset data. The customer care representative may not need to request for the user to hang up a voice call for the purpose of identifying and communicating handset data.

The handset service component 116 may connect the handset 102 to a specific connection based on the selection and/or the communicated handset data. For example, if the user selection identified a problem with the handset battery, the handset service component 116 connects the handset 102 to a specific connection at the customer care center 108 at which customer care representatives who are trained to resolve handset battery problems may speak with the user. In another example, if the handset data identifies a processor problem, the handset service component 116 connects the handset 102 to a specific connection at the customer care center 108 at which customer care representatives who are trained to resolve processor problems may speak with the user.

When connecting the handset 102 to the customer care center 108, the handset service component 116 may place a call associated with the handset 102 in a service queue associated with a specific connection. For example, if the user selection identifies a battery problem, the user's call is placed in a service queue for speaking to customer service representatives who are trained to resolve battery problems. When connecting the handset 102 to the customer care center 108, the handset service component 116 may place a call forward in a service queue based on a duration of time associated with intercepting the connection request associated with the entered number and connecting the handset to the entered number. For example, if the user spends 45 seconds making user selections via the handset service component 116 before the user's call is connected to the customer care center 108, the user's call is placed in a service queue ahead of other calls that have been waiting for less than a total of 45 seconds. This queue management reduces the possibility that the user who responds to service options offered by the handset service component 116 spends any more time waiting to speak to a customer care representative than other users whose calls initially connected to the customer care center 108 without being intercepted by the dialer component 114. When connecting the handset 102 to the customer care center 108, the handset service component 116 may enable bypassing of an option or a layer in a decision tree presented by an interactive voice response system associated with the specified service. For example, if the user selections identified a specific type of handset battery problem, the handset service component 116 connects the call to the IVR at the customer care center 108 such that the user does not hear any of the prompts that precede the identification of the specific type of battery problem. In an embodiment, another service option may include cloning a new phone to leverage captured user and/or device data. The user may then be notified that they can pick up the new phone at a specific time and location.

The handset service component 116 may provide the communicated handset data to a specified service representative. For example, when a customer care representative who is trained to resolve handset battery problems speaks with the user, the representative has access to the handset data that identifies the handset battery problem. The customer care center 108 may send a message to the user interface 112 that suggests a manner to receive the specified service. For example, the customer care center 108 sends a message to the user interface 112 that identifies the location that is geographically closest to the handset's current location so that the user may obtain a replacement handset battery.

Instead of presenting user interface service options such as selecting buttons, controls, or graphical elements when the dialer component 114 intercepts a call to the customer care center 108, the service component 116 may simulate the voice based interface of the customer care center 108, such that the user may think that the requested voice call has connected to the customer care center 108. Answers to simple questions such as account balances or pre-recorded information can be provided without intervention from a customer care representative. For example, account balances may be periodically updated to the handset 102 and stored in a memory of the handset 102 from the service provider. Pre-recorded interactive voice response menu trees or portions of menu trees may be updated to the handset 102 and stored in a memory of the handset 102 from the service provider when the corresponding IVR of the customer care center 108 is updated. In this embodiment, pre-recorded audio segments may be played back from a memory in the handset 102 without the need for the handset 102 to connect to the customer care center 108. Account numbers from the IVR may be compared to caller identification (ID) data for security reasons and additional IVR responses may be required if the caller ID data does not match the account record. The caller may be asked to identify themselves by methods such as a personal identification number (PIN) or password. IVR systems generally scale well to handle large call volumes for customer care centers 108 of communication service providers. IVR systems are typically used to service high call volumes, reduce cost and improve the customer experience. A communication service provider may provide the services of customer care representatives and/or an IVR without charge. Furthermore, a communication service provider may not charge their customers for the voice calls from their customers' handsets to the communication service provider's customer care centers 108. A service provider may reduce its own expenses by providing efficient customer care that minimizes the amount of time that handsets are communicating with their customer care centers 108, which also may increase customer satisfaction. The user interface 112 may present interactive voice response system service options based on the server 110 executing the server service component 118 or the handset 102 executing the handset service component 116. For example, the handset service component 116 may present interactive voice response system service options based on the most recently received service options or the server service component 118 may present interactive voice response system service options based on service options currently offered by the customer care center 108.

The handset service component 116 may further build a log of all "*2" sessions initiated by the handset 102 that identify customer care call attempts, successful intercepts and solutions of problems made by the internal interactive voice response system of the handset 102, and unsuccessful attempts made by the internal interactive voice response system of the handset 102 to resolve problems. The handset service component 116 may provide the log of "*2" sessions to the specified service representative. For example, when a customer care representative who is trained to resolve handset problems speaks with the user, the representative has access to the log of "*2" sessions.

Similar to the presentation of graphic user interface service options, because no voice call has been established yet, the service component 116 may run a diagnostic program to identify handset data and communicate the handset data to the server 110 for the customer care center 108 before any requested call is actually connected to the customer care center 108. Instead of providing a voice call to the customer care center 108 to address the selected service option via a customer care representative and/or an IVR, the handset service component 116 provides handset data to the server 110 based on the selection. If the user subsequently speaks with a customer care representative, in an embodiment, the customer care center 108 may connect to the server 110 and obtain the handset data. In this case, the representative may already have access to the handset data and may not need to ask the user to hang up the voice call for the purpose of identifying and receiving the handset data.

The handset service component 116 may determine whether the handset 102 is subscribed to a push-to-talk communication service. If the handset service component 116 determines that the handset 102 is subscribed to a push-to-talk communication service, the handset service component 116 may provide the handset data to the server 110 via a push-to-talk network. Handset data sent via a push-to-talk network may be less expensive for the communication service provider than handset data sent via a voice network or a data session to the server 110. Reasons for the reduced expenses of handset data sent via push-to-talk networks may include the significant loads that handset data may place on voice networks and data networks compared to the relative under-utilization of push-to-talk networks.

The handset 102 may provide push-to-talk communication via one technology network and communicate voice calls and data sessions via a different technology network. For example, the push-to-talk communication may be via an integrated digital enhanced network (IDEN) communication technology or a code division multiple access (CDMA) technology. Voice calls and data sessions may be communicated via a code division multiple access (CDMA) technology, a global system for mobile communication (GSM) technology, a universal mobile telecommunications system (UMTS) technology, a long-term evolution (LTE) technology, or a worldwide interoperability for microwave access (WiMAX) technology. Additionally, the handset service component 116 may provide the handset data as a short message service (SMS) message via a wireless paging channel. Therefore, a communication service provider may realize additional savings if the handset service component 116 sends the handset data via an under-utilized DEN network or a wireless paging channel instead of via a heavily loaded CDMA network. Using text messages and data messages before a call is connected may consume considerably less time, effort, and expenses for a communication service provider than initially connecting voice calls to customer care centers. While handset users may speak to a customer care representative for special cases, the reduction in voice call volume may enable customer care representatives to be available for the special cases and may reduce communication time and expenses for both the handset user and the service provider.

The server 110 may receive the handset data, identify a specific handset problem, determine a response to the problem, and send the response as a text message or a data session to the handset service component 116. The handset service component 116 may present information received in a response via the user interface 112, such as displaying information from a text message based on handset data that identifies a specific battery problem. By communicating with the server 110 via text messages and/or data sessions, the handset 102 avoids lengthy voice communications by communicating quickly with the server 110. Text messages and data sessions may minimize the communication time for the system 100, thereby minimizing expenses for the communication service provider. The handset 102 may complete its communication quickly, without the need for a lengthy voice call to a customer care representative at the customer care center 108. The handset 102 also may avoid any delays that occur while the user of the handset 102 makes numerous superfluous selections from an IVR to submit a request or while the user explains the request to a customer care representative at the customer care center 108. Providing such service options may significantly reduce the expenses incurred for handset requests to the customer care center 108 by responding to requests in a quicker and less expensive manner, which may increase customer satisfaction.

Figure 2:
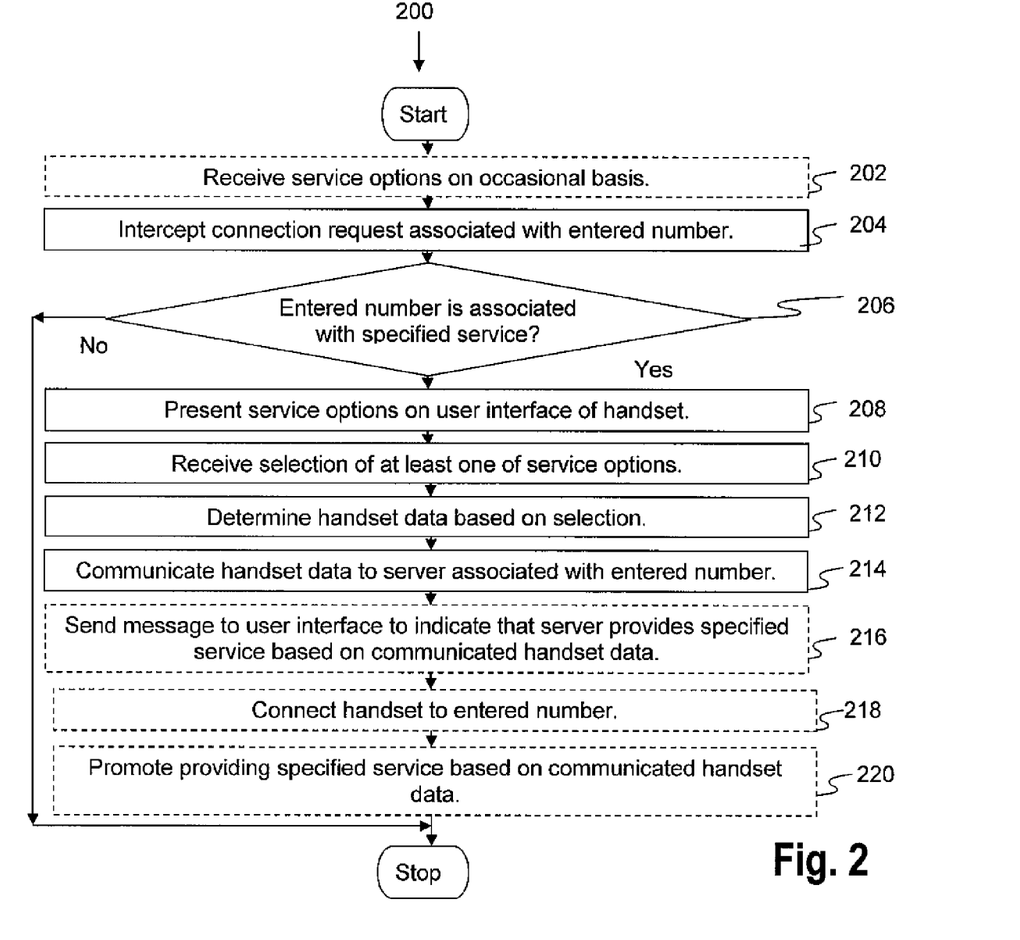
FIG. 2 is a flowchart of a method for handset diagnostics according to some embodiments of the present disclosure.

FIG. 2 is a flowchart of a method 200 for handset diagnostics according to some embodiments of the present disclosure. The system 100 can execute the method 200 to display service options and send handset data to the server 110 based on the service options selected.

In box 202, service options are optionally received on an occasional basis. For example, the handset service component 116 occasionally receives the latest service options offered by the customer care center 108.

In box 204, a connection request associated with an entered number is intercepted. For example, the dialer component 114 intercepts a call to the customer care center 108.

In box 206, a determination is made whether an entered number is associated with a specified service. For example, the dialer component 114 determines whether the call is to the customer care center 108. If the entered number is associated with a specified service, the method 200 continues to box 208. If the entered number is not associated with a specified service, the method 200 terminates.

In box 208, service options are provided to the handset user interface. For example, the handset service component 116 provides IVR service options to the user interface 112.

In box 210, selection of at least one service option is received. For example, the handset service component 116 receives a selection of an IVR service option that identifies a problem with the handset battery.

In box 212, handset data is determined based on selection. For example, the handset service component 116 executes a diagnostic program that determines handset battery data.

In box 214, handset data is communicated to a server associated with an entered number. For example, the handset service component 116 sends the handset battery data in an SMS message sent via a wireless paging channel to the server 110

In box 216, a message is optionally sent to a user interface to indicate that a server provides a specified service based on communicated handset data. For example, the handset service component 116 sends a message to the user interface 112 to indicate that the server 110 corrected the problem with the configuration value for the roaming selection status.

In box 218, a handset is optionally connected to an entered number. For example, the handset service component 116 determines the duration of time that the user made selections from the IVR service options on the handset 102, connects the handset 102 to the customer care center 108, and places the call in a service queue based on the identified problem, wherein the call is placed ahead of other calls in the service queue based on the determined duration of time.

In box 220, providing a specified service is optionally promoted based on communicated handset data. For example, a customer care representative instructs the user how to address the handset battery problem based on the handset data communicated to the server 110.

Figure 3:
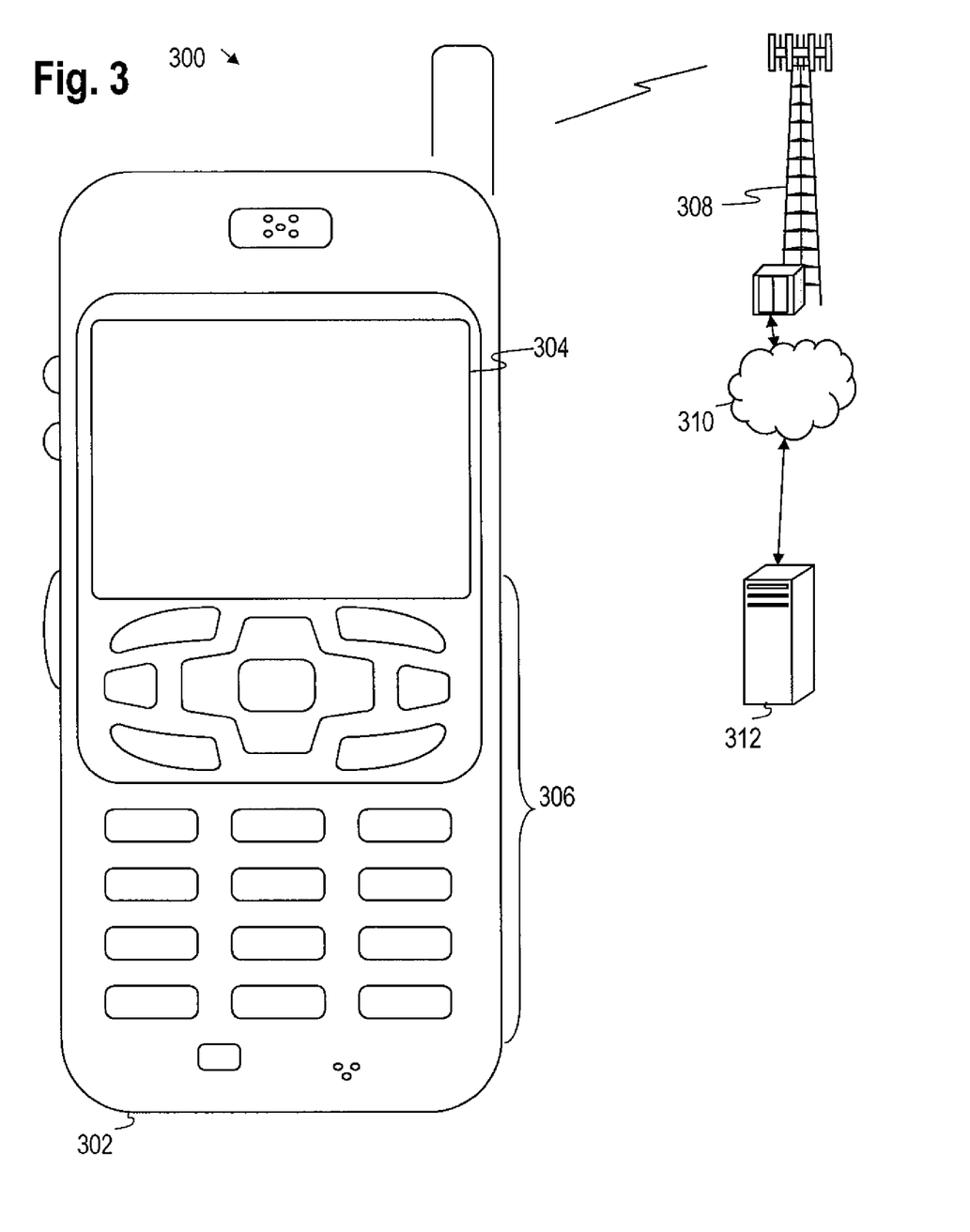
FIG. 3 shows an illustrative wireless communications system according to some embodiments of the present disclosure.

FIG. 3 shows a wireless communications system 300 including a handset 302. In an embodiment, the handset 102 may be implemented as the handset 302. FIG. 3 depicts the handset 302, which is operable for implementing aspects of the present disclosure, but the present disclosure should not be limited to these implementations. Though illustrated as a mobile phone, the handset 302 may take various forms including a telephone, a wireless communication device, a pager, a personal digital assistant (PDA), a portable computer, a tablet computer, a laptop computer, a digital camera, a digital music player, a digital calculator, an electronic key fob for keyless entry, a media player, and an inventory control device. Many suitable handsets 302 combine some or all of these functions. In some embodiments of the present disclosure, the handset 302 is not a general purpose computing device, but rather is a special-purpose communications device such as a mobile phone, wireless mobile device, pager, or PDA. The handset 302 may support specialized activities such as gaming, inventory control, job control, and/or task management functions, and so on.

The handset 302 includes the display 304 and a touch-sensitive surface or keys 306 for input by a user. The handset 302 may present options for the user to select, controls for the user to actuate, and/or cursors or other indicators for the user to direct. The handset 302 may further accept data entry from the user, including numbers to dial or various parameter values for configuring the operation of the handset 302. The handset 302 may further execute one or more software or firmware applications in response to user commands. These applications may configure the handset 302 to perform various customized functions in response to user interaction. Additionally, the handset 302 may be programmed and/or configured over-the-air, for example from a wireless base station, a wireless access point, or a peer handset 302.

The handset 302 may execute a web browser application which enables the display 304 to show a web page. The web page may be obtained via wireless communications with the base transceiver station 308, which may be the base transceiver station 104, a wireless network access node, a peer handset 302 or any other wireless communication network or system. While a single base transceiver station 308 is illustrated, it is understood that the wireless communication system may comprise additional base transceiver stations 308. In some instances, the handset 302 may be in communication with multiple base transceiver stations 308 at the same time. The base transceiver station 308 (or wireless network access node) is coupled to the network 310, which may be the network 106. Via the wireless link and the network 310, the handset 302 has access to information on various servers, such as the server 312, which may be the server 110. The server 312 may provide content that may be shown on the display 304. Alternately, the handset 302 may access the base transceiver station 308 through a peer handset 302 acting as an intermediary, in a relay type or hop type of connection.

Figure 4:
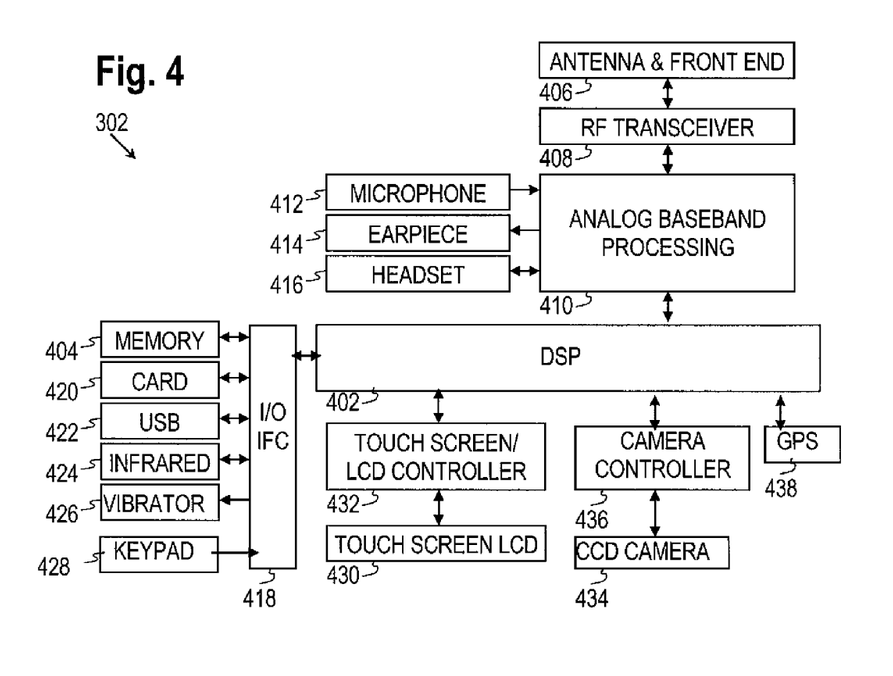
FIG. 4 is a block diagram of an illustrative handset according to some embodiments of the present disclosure.

FIG. 4 is a block diagram of the handset 302. While a variety of known components of the handset 302 are depicted, in an embodiment a subset of the listed components and/or additional components not listed may be included in the handset 302. The handset 302 includes a digital signal processor (DSP) 402 and a memory 404. As shown, the handset 302 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the handset 302 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the handset 302 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 302 to send and receive information from a radio access network (RAN) or some other available wireless communications network or from a peer handset 302. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the handset 302 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the handset 302 to function as a peripheral device to exchange information with a personal computer or other computer system. The infrared port 424 and other optional ports such as a Bluetooth interface or an IEEE 802.11 compliant wireless interface may enable the handset 102 to communicate wirelessly with other nearby handsets 302 and/or wireless base stations.

The input/output interface 418 may further connect the DSP 402 to the vibrator 426 that, when triggered, causes the handset 302 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the handset 302. Another input mechanism may be the touch screen LCD 430, which may also display text and/or graphics to the user. The touch screen LCD controller 432 couples the DSP 402 to the touch screen LCD 430.

The CCD camera 434 enables the handset 302 to take digital pictures. The DSP 402 communicates with the CCD camera 434 via the camera controller 436. The GPS sensor 438 is coupled to the DSP 402 to decode global positioning system signals, thereby enabling the handset 302 to determine its position. In another embodiment, a camera operating according to a technology other than charge coupled device cameras may be employed. Various other peripherals also may be included to provide additional functions, e.g., radio and television reception.

Figure 5:
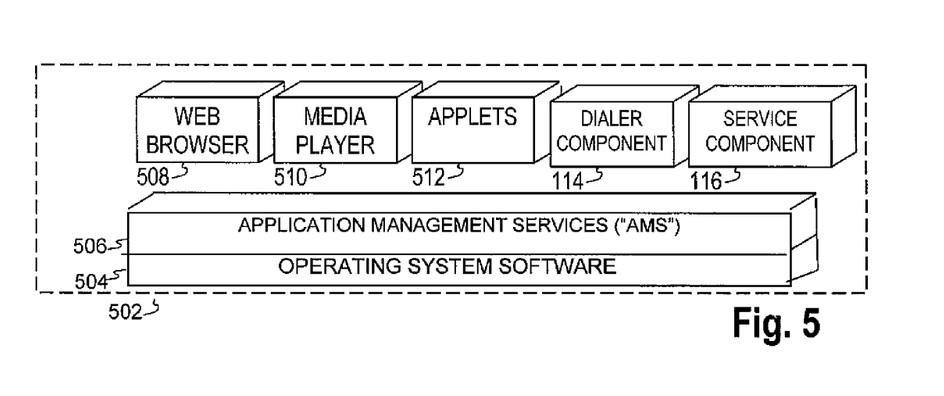
FIG. 5 is a block diagram of an illustrative software configuration for a handset according to some embodiments of the present disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 302. Also shown in FIG. 5 are a web browser application 508, a media player application 510, JAVA applets 512, the dialer component 114, and the handset service component 116. The web browser application 508 configures the handset 302 to operate as a web browser, allowing a user to enter information into forms and select links to retrieve and view web pages. The media player application 510 configures the handset 302 to retrieve and play audio or audiovisual media. The JAVA applets 512 configure the handset 302 to provide games, utilities, and other functionality.

Figure 6:
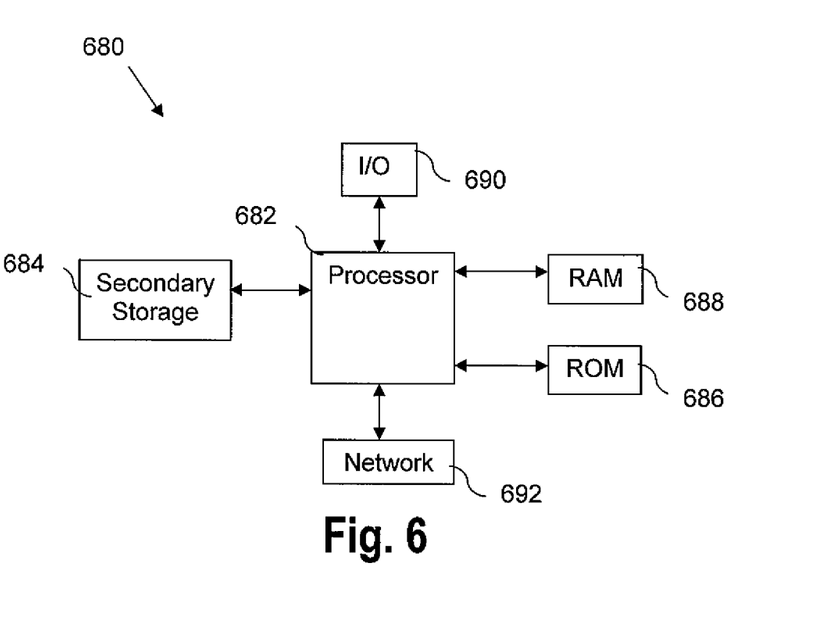
FIG. 6 shows an illustrative computer system suitable for implementing portions of the several embodiments of the present disclosure.

Some aspects of the system described above may be implemented on a computer with sufficient processing power, memory resources, and network throughput capability to handle the necessary workload placed upon it. FIG. 6 illustrates a typical computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for handset diagnostics, comprising:
   a processor on a handset;
   a memory on the handset;
   a dialer component stored in the memory, that when executed by the processor, intercepts a connection request associated with an entered number, and determines whether the entered number is associated with a specified service; and
   a service component stored in the memory, that when executed by the processor, presents, without establishing a voice call or a data session, service options on a user interface of the handset in response to a determination that the entered number is associated with the specified service, receives a selection of at least one of the service options, determines handset data based on the selection of at least one of the service options without establishing the voice call or the data session, establishes a data session with a server associated with the entered number, wirelessly communicates the handset data to the server associated with the entered number, ends the data session with the server, and establishes a voice connection, after ending the data session, between the handset and the entered number, wherein the server promotes providing the specified service based on the communicated handset data at the server, wherein the handset is not able to support simultaneous communications via data sessions and voice calls, wherein establishing the voice connection between the handset and the entered number comprises connecting the handset to a specific connection based on the communicated handset data by placing a call associated with the handset forward in a service queue associated with the specific connection based on a duration of time associated with intercepting the connection request associated with the entered number and connecting the handset to the entered number.

2. The system of claim 1, wherein the handset is one of a mobile phone, a telephone, a wireless communication device, a pager, a personal digital assistant, a portable computer, a tablet computer, a laptop computer, a digital camera, a digital music player, a digital calculator, an electronic key fob for keyless entry, a media player, and an inventory control device.

3. The system of claim 1, wherein the handset wirelessly communicates via one of a code division multiple access (CDMA) technology, a global system for mobile communication (GSM) technology, a universal mobile telecommunications system (UMTS) technology, a long-term evolution (LTE) technology, a worldwide interoperability for microwave access (WiMAX) technology, and integrated digital enhanced network (IDEN) technology.

4. The system of claim 1, wherein the entered number that is associated with the specified service comprises a shortcut number used to call the specified service.

5. The system of claim 1, wherein providing the specified service based on the communicated handset data comprises providing the communicated handset data to a specified service representative.

6. The system of claim 1, wherein providing the specified service based on the communicated handset data comprises sending a message to the user interface that suggests a manner to receive the specified service.

7. The system of claim 1, wherein the handset data comprises at least one of a battery state, geo-location of the handset, a roaming selection status, radio environment conditions, a camera setting, an error log, a record of a problem, dropped calls information, a handset system parameter, a configuration value, and a processor usage.

8. A computer implemented method for handset diagnostics, comprising:

intercepting, by a dialer component stored in a memory in a handset and executed by a processor in the handset, a connection request associated with an entered number;

determining, by the dialer component, whether the entered number is associated with a specified service;

presenting, by a service component stored in a second memory and executed by a second processor, without establishing a voice call or a data session, service options on a user interface of the handset in response to a determination that the entered number is associated with the specified service;

receiving, by the service component, a selection of at least one of the service options;

determining, by the service component, handset data based on the selection of at least one of the service options without establishing the voice call or the data session;

wirelessly communicating, by the service component, the handset data to a server associated with the entered number;

establishing, by the service component, after wirelessly communicating the handset data to the server, a voice connection between the handset and the entered number, wherein establishing the voice connection between the handset and the entered number comprises connecting the handset to a specific connection based on the communicated handset data by placing a call associated with the handset forward in a service queue associated with the specific connection based on a duration of time associated with intercepting the connection request associated with the entered number and connecting the handset to the entered number; and promoting, by the server, providing the specified service based on the communicated handset data.

9. The computer implemented method of claim 8, wherein presenting service options on the user interface of the handset comprises at least one of presenting interactive voice response system service options and presenting graphic user interface service options.

10. The computer implemented method of claim 9, wherein presenting interactive voice response system service options is based on one of the second processor executing the service component in the second memory on the server, and the second processor executing the service component in the second memory on the handset, wherein the second processor and the processor on the handset are a same processor, and wherein the second memory and the memory on the handset are a same memory.

11. The computer implemented method of claim 8, wherein communicating the handset data to the server comprises communicating via at least one of a data session, a voice session, a short message service (SMS) message, and a multimedia messaging service (MMS) message.

12. The computer implemented method of claim 11, wherein communicating via a short message service (SMS) message comprises communicating via a handset wireless paging channel.

13. The computer implemented method of claim 8, wherein receiving selection of the at least one of the service options enables bypassing of an option presented by an interactive voice response system associated with the specified service.

14. The computer implemented method of claim 8, wherein connecting the handset to the specific connection is further based on the selection.

15. A system for handset diagnostics, comprising:

a processor on a handset;

a memory on the handset;

a dialer component stored in the memory, that when executed by the processor, intercepts a connection request associated with an entered number, and determines whether the entered number is associated with a specified service; and a service component stored in the memory, that when executed by the processor, without establishing a voice call or a data session, presents service options on a user interface of the handset in response to a determination that the entered number is associated with the specified service, receives a selection of at least one of the service options, determines handset data based on the selection of at least one of the service options without establishing the voice call or the data session, wirelessly communicates the handset data to a server associated with the entered number, sends a message to the user interface to indicate that the server provides the specified service based on the communicated handset data and establish, after wirelessly communicating the handset data to the server, a voice connection between the handset and the entered number, wherein establishing the voice connection between the handset and the entered number comprises connecting the handset to a specific connection based on the communicated handset data by placing a call associated with the handset forward in a service queue associated with the specific connection based on a duration of time associated with intercepting the connection request associated with the entered number and connecting the handset to the entered number.

16. The system of claim 15, wherein the specified service is associated with at least one of a customer care service and a self-provisioning service.

17. The system of claim 15, wherein the service component further receives the service options on an occasional basis.

* * * * *